(12) United States Patent
Parekh et al.

(10) Patent No.: US 10,887,312 B2
(45) Date of Patent: Jan. 5, 2021

(54) SECURE COMMUNICATION BETWEEN A SERVICE HOSTED ON A PRIVATE CLOUD AND A SERVICE HOSTED ON A PUBLIC CLOUD

(71) Applicant: Hewlett Packard Enterprise Development LP, Houston, TX (US)

(72) Inventors: Hardik Dhirendra Parekh, Bangalore Karnataka (IN); Om Kumar, Bangalore Karnataka (IN); Kiran Kumar Vaddi, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 104 days.

(21) Appl. No.: 16/142,601

(22) Filed: Sep. 26, 2018

(65) Prior Publication Data
US 2020/0099687 A1    Mar. 26, 2020

(51) Int. Cl.
*H04L 29/06* (2006.01)
(52) U.S. Cl.
CPC ............... *H04L 63/10* (2013.01); *H04L 63/08* (2013.01); *H04L 63/166* (2013.01); *H04L 63/20* (2013.01)
(58) Field of Classification Search
CPC ....... H04L 63/10; H04L 63/08; H04L 63/166; H04L 63/20
See application file for complete search history.

(56) References Cited

U.S. PATENT DOCUMENTS

| | | | |
|---|---|---|---|
| 8,458,453 B1 | 6/2013 | Mahalingaiah | |
| 9,621,405 B2 | 4/2017 | Chaudhry et al. | |
| 9,917,865 B2 | 3/2018 | Arora et al. | |
| 2010/0262650 A1* | 10/2010 | Chauhan | H04L 67/26 709/203 |
| 2012/0281708 A1* | 11/2012 | Chauhan | H04L 63/0272 370/401 |
| 2013/0007299 A1* | 1/2013 | German | H04L 67/26 709/237 |
| 2013/0086228 A1* | 4/2013 | Goldman | H04L 29/08117 709/219 |
| 2016/0241633 A1 | 8/2016 | Overby et al. | |

(Continued)

OTHER PUBLICATIONS

Beaupre, M.; "NetApp Private Storage for Amazon Web Services (AWS)"; Apr. 2016; 46 pages.

(Continued)

*Primary Examiner* — Oleg Korsak
(74) *Attorney, Agent, or Firm* — Hewlett Packard Enterprise Patent Department

(57) ABSTRACT

Examples described relate to secure communication between services hosted on a private cloud and a public cloud. In an example, an agent on a private cloud may poll a secure server on a public cloud to determine whether the secure server includes a request for a service hosted on the private cloud. The request may be made by a service hosted on the public cloud. In response to a determination that the secure server includes the request for the service hosted on the private cloud the agent may retrieve the request from the secure server on the public cloud. The request may be executed on the private cloud, and a response may be generated. The agent may provide the response to the secure server on the public cloud. The response may be shared with the service hosted on the public cloud by the secure server.

20 Claims, 5 Drawing Sheets

(56) References Cited

U.S. PATENT DOCUMENTS

| | | | |
|---|---|---|---|
| 2017/0339070 A1* | 11/2017 | Chang | H04L 47/829 |
| 2018/0027050 A1* | 1/2018 | Pogrebinsky | H04L 67/10 |
| | | | 709/223 |
| 2019/0028552 A1* | 1/2019 | Johnson, II | H04L 67/16 |

OTHER PUBLICATIONS

Virosoft; "Demo as a Service"; 2 pages; printed on May 1, 2018 from: http://www.virsoft.net/Documents/Virsoft%20Datasheet%20for%20web.pdf.

* cited by examiner

US 10,887,312 B2

SECURE COMMUNICATION BETWEEN A SERVICE HOSTED ON A PRIVATE CLOUD AND A SERVICE HOSTED ON A PUBLIC CLOUD

BACKGROUND

The advent of cloud-based computing architectures has opened new possibilities for businesses. As a result, an increasing number of enterprises are adopting cloud computing based solutions. Generally speaking, cloud computing involves delivery of computing as a service rather than a product, whereby shared resources (software, storage resources, etc.) are provided to computing devices as a service. The resources are shared over a network such as the internet. Cloud computing thus provides a quick and scalable access to computing resources and information technology (IT) services.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
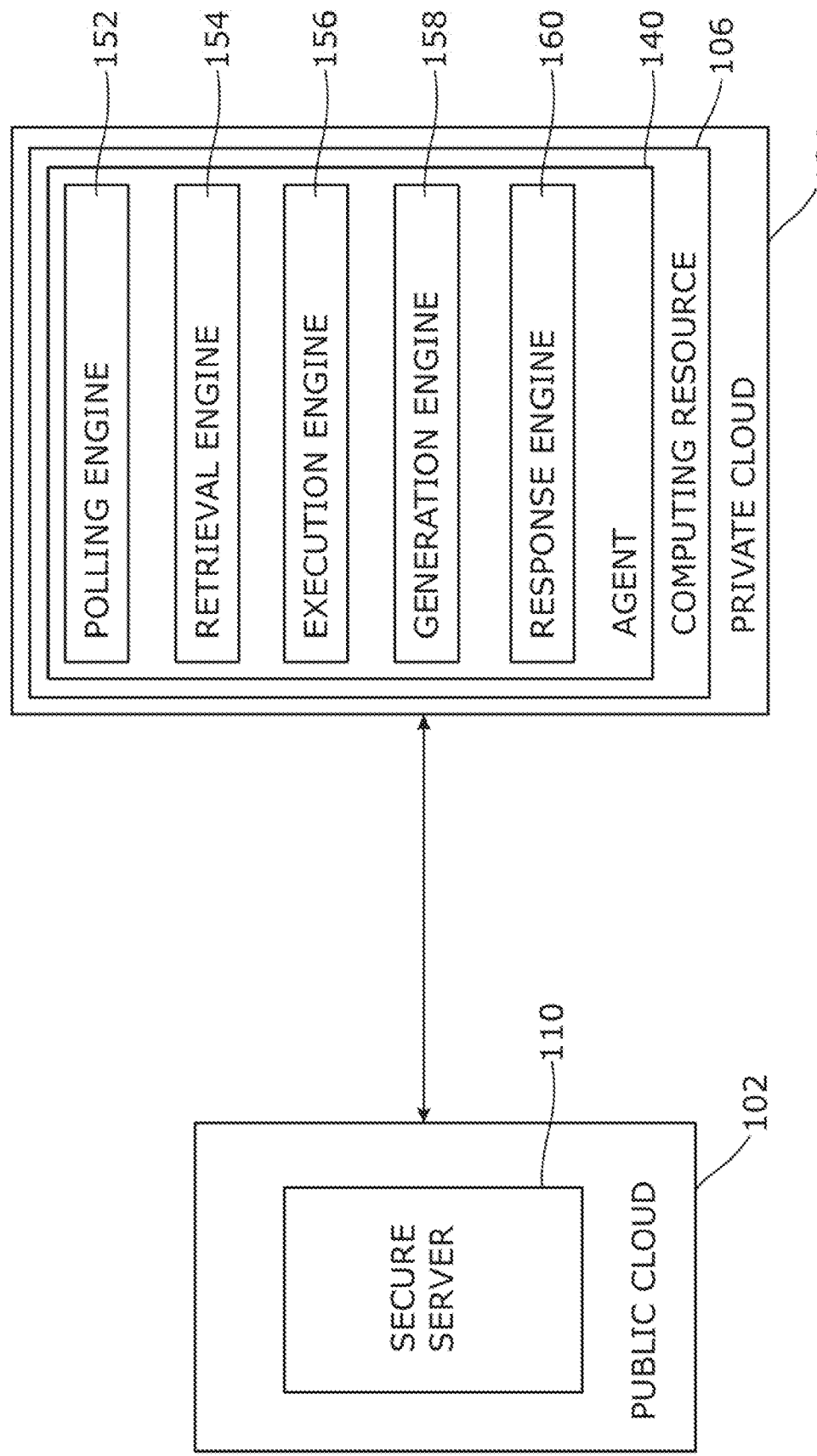
FIG. 1 is a block diagram of an example computing environment for providing a secure communication between a service hosted on a private cloud and a service hosted on a public cloud.

Cloud computing is a delivery model for technology-enabled services that provides on-demand and pay-as-you-use access to an elastic pool of shared computing resources. Some examples of such resources may include applications, servers, storage, networks, etc. Cloud computing allows rapid provisioning of computing resources that could be scaled up or down depending on the requirements of a customer. Thus, these assets may be consumed "as a service".

There are many models of cloud computing such as Infrastructure-as-a-Service (IaaS), Platform-as-a-Service (PaaS) and Software-as-a-Service (SaaS). Depending on a client's requirement, a cloud service provider may provide either of the aforementioned services, each of which may require provisioning of certain resources on a cloud.

As used herein, the term "cloud" (or cloud system) may include a public cloud, a private cloud, or a hybrid cloud. To explain briefly, a cloud may be termed as a public cloud if cloud computing services are rendered over a public network such as the internet. On the other hand, a private cloud is a proprietary network that supplies services to a specific set of users. A hybrid cloud combines private and public cloud services.

Public clouds are the most common way of deploying cloud computing. There are certain services that are still hosted on a private cloud due to security and legal considerations. However, there may be services hosted on public clouds that may desire to communicate with services hosted on private clouds. But private clouds are typically behind a corporate firewall and deny ingress traffic. Opening of ports to enable communication may not be a desirable option since network administrators may consider it as a security risk. Further, this approach is not scalable if there are a lot of dynamic services that require network administrator intervention. Services on a public cloud may also prefer to have a seamless integration with services on a private cloud without having to be aware of the internal details of a secure communication channel. To achieve improved business value, it may be desirable if services hosted on public clouds and services hosted on provide clouds could communicate in a secure manner.

To address these technical challenges, the present disclosure describes various examples for secure communication between services hosted on a private cloud and a public cloud. In an example, an agent on a private cloud may poll a secure server on a public cloud to determine whether the secure server includes a request for a service hosted on the private cloud. The request may be made by a service hosted on the public cloud. In response to a determination that the secure server includes the request for the service hosted on the private cloud the agent may retrieve the request from the secure server on the public cloud. The agent may execute the request on the private cloud, and generate a response. The agent may then provide the response to the secure server on the public cloud. The response may be shared with the service hosted on the public cloud by the secure server.

FIG. 1 is a block diagram of an example computing environment 100 for providing a secure communication between a service hosted on a private cloud and a service hosted on a public cloud. In an example, computing environment 100 may include a public cloud 102 and a private cloud 104.

In public cloud 102, the cloud resources (like servers and storage) may be owned and operated by a third-party cloud service provider and delivered over the Internet. In a public cloud 102, the cloud resources may be shared with other organizations. On the other hand, in private cloud 104, the cloud resources may be used exclusively by one organization.

In an example, public cloud 102 and private cloud 104 may each include computing resources, network resources, and/or storage resources. Computing resources may include a computing device (i.e. includes at least one processor). The computing device may represent any type of system capable of reading machine-executable instructions. Examples of the computing device may include a server, a desktop computer, a notebook computer, a tablet computer, a thin client, a mobile device, a personal digital assistant (PDA), and the like. In an example, computing resources may represent software resources (machine-executable instructions). The software resources may include, for example, operating system software, firmware, and application software. Other examples of the software resources may include virtual machines, virtual servers, load balancers, firewalls, etc. In an example, computing resources may be a combination of hardware and software resources.

Network resources may include a network device, a network software, or any combination thereof. Some non-limiting examples of the network device may include a hub, a network switch, a network router, a virtual switch, and a virtual router.

Storage resources may include a storage device, a storage software, or any combination thereof. The storage device may be an internal storage device, an external storage device, or a network attached storage device. Other examples of the storage device may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, the storage device may be a Direct Attached Storage (DAS) device, a Network Attached Storage (NAS) device, a Redundant Array of Inexpensive Disks (RAID), a data archival storage system, or a block-based device over a storage area network (SAN).

Public cloud 102 and private cloud 104 may be communicatively coupled, for example, via a computer network. The computer network may be a wireless or wired network. In an example, the computer network may be a public network (for example, the Internet).

In an example, public cloud 102 and private cloud 104 may each be used to provide or deploy various types of cloud services. These services may include, for example, Infrastructure as a Service (IaaS), Platform as a Service (PaaS), and Software as a Service (SaaS).

In an example, a computing resource 106 on private cloud may include a polling engine 152, a retrieval engine 154, an execution engine 156, a generation engine 158, and a response engine 160. In an example, polling engine 152, retrieval engine 154, execution engine 156, generation engine 158, and response engine 160 may be part of an agent 140 on computing resource 106.

Engines 152, 154, 156, 158, and 160 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the computing resource 106. In some examples, the at least one machine-readable storage medium may store instructions that, when executed by the at least one processing resource, at least partially implement some or all engines of the computing device. In such examples, the computing resource 106 may include the at least one machine-readable storage medium storing the instructions and the at least one processing resource to execute the instructions. In an example, agent 140 may be any combination of hardware and programming. In an example, engines 152, 154, 156, 158, 160, and agent 140 may be a part of a Representational state transfer (RESTful) service.

Figure 2:
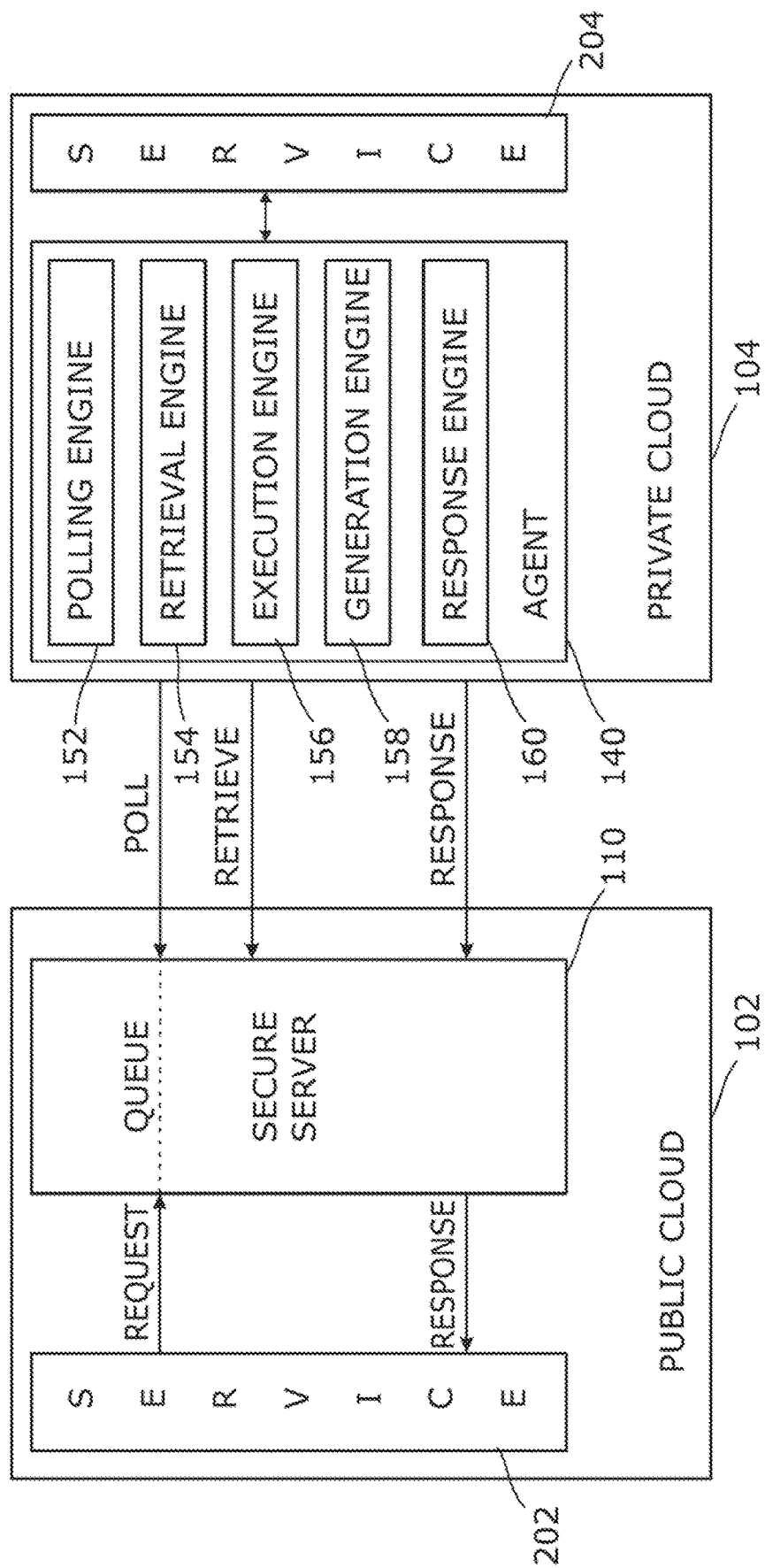
FIG. 2 is a block diagram of an example flow process for providing a secure communication between a service hosted on a private cloud and a service hosted on a public cloud.

Referring to FIG. 2, in an example, polling engine 152 may poll a secure server 110 on public cloud 102 to determine whether the secure server 110 includes a request for a service 204 hosted on a private cloud 104. In an example, the request for the service 204 hosted on private cloud may be made by a service 202 hosted on public cloud.

In an example, a service 202 hosted on public cloud 102 may make a request for a service 204 hosted on private cloud 104 by creating a Hypertext Transfer Protocol (HTTP) client. HTTPclient is a client side HTTP transport library, which may be used to execute HTTP(s) methods. Execution of an HTTP(s) method may involve one or several HTTP request and HTTP(s) response exchanges. An HTTP(s) request object may be provided to HTTPclient for execution. The request may be routed to a target server, which may provide a response object in response, or throw an exception if execution was unsuccessful. The HTTPclient has a Transport field, which enables an HTTP request to be routed to a particular destination. In order to route the request to the secure server, the service making the request may specify secure server in the Transport field. In response to such specification, the request is routed to the secure server. In an example, the secure server may include a computing resource on public cloud.

In an example, a task engine (not illustrated) on the secure server 110 may receive the HTTPclient request. Since multiple services on public cloud may request for a service(s) hosted on private cloud, multiple HTTPclient requests may get generated, which in turn may get routed to the secure server 110. The task engine on the secure server 110 may queue the multiple HTTPclient requests based on, for example, their time of receipt.

In an example, polling engine 152 on private cloud 104 may poll the task engine to determine whether a request for a service 204 hosted on private cloud 104 is present on the secure server 110. In an example, polling engine 152 may poll the secure server 110 on public cloud 102 at pre-defined time periods. In response to a determination that the secure server 110 includes a request for a service 204 hosted on private cloud 102, retrieval engine 154 may retrieve the request from the secure server 110. In an example, Transport Layer Security (TLS) authentication may be used during the retrieval. In TLS authentication, the agent (client) 140 may use a certificate to authenticate itself during the TLS handshake. Once the TLS connection is established (and authenticated), the agent 140 and the secure server 110 may run HTTP(s) on top of the TLS layer. In an example, retrieval engine 154 may retrieve the requests received by the secure server based on first in, first out (FIFO) process, wherein the oldest (first) entry (request) is processed first.

In an example, upon retrieval, execution engine 156 may execute the request for the service hosted on the private cloud 104. In response to the execution, generation engine 158 may generate a response, which may be provided to response engine 160. In another example, execution engine 156 may share the request with the service hosted on private cloud 104. Upon execution of the request, the service hosted on the private cloud 104 may generate a response. The response may be shared with response engine 160.

Response engine 160 may provide the response to the secure server 110 on public cloud. In an example, the response to the server 110 on the public cloud 102 may be provided via port 80. In an example, the response to the server 110 on the public cloud 102 may be provided via port 443. In an example, the response to the server on the public cloud may be provided through HTTP. The secure server 110 in turn may share the response with the service 202 on the public cloud 102 that made the request.

In an example, the task engine (not illustrated) on the secure server 110 may assign a Globally Unique Identifier (GUID) to each request that it receives for a service on private cloud. A GUID may include a 128-bit unique number that may be used to identify a request. When retrieval engine 154 retrieves a request from the secure server 110, it may also retrieve the unique GUID assigned to the request. When response engine 160 provides the response generated consequent to the execution of the request on private cloud 104, it includes the GUID corresponding to the request. Task engine thus may use a GUID to correlate a request and a response thereto.

Figure 3:
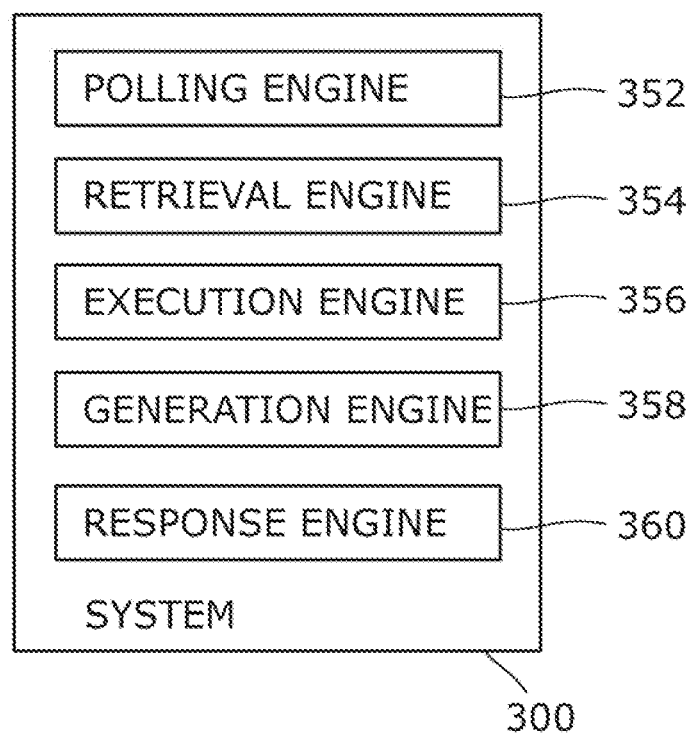
FIG. 3 is a block diagram of an example computing system for providing a secure communication between a service hosted on a private cloud and a service hosted on a public cloud.

FIG. 3 is a block diagram of an example computing system 300 for providing a secure communication between a service hosted on a private cloud and a service hosted on a public cloud. In an example, computing system 300 may be analogous to the computing resource 106 of FIG. 1, in which like reference numerals correspond to the same or similar, though perhaps not identical, components. For the sake of brevity, components or reference numerals of FIG. 3 having a same or similarly described function in FIG. 1 are not being described in connection with FIG. 3. Said components or reference numerals may be considered alike.

In an example, system 300 may represent any type of computing device capable of reading machine-executable instructions. Examples of computing device may include, without limitation, a server, a desktop computer, a notebook computer, a tablet computer, a thin client, a mobile device, and the like.

In an example, system 200 may include a polling engine 352, a retrieval engine 354, an execution engine 356, a generation engine 358, and a response engine 360 may perform functionalities similar to those described earlier in reference to polling engine 152, retrieval engine 154, execution engine 156, generation engine 158, and response engine 160, respectively.

In an example, polling engine 352 may poll a secure server on a public cloud to determine whether the secure server includes a request for a service hosted on a private cloud. The request may be made by a service hosted on the public cloud. In response to a determination that the secure server includes the request for the service hosted on the private cloud, retrieval engine 354 may retrieve the request from the secure server on the public cloud. Execution engine 356 may execute the request on the private cloud. In response to the execution, generation engine 358 may generate a response. Response engine 360 may provide the response to the secure server on the public cloud. The response may be shared with the service hosted on the public cloud by the secure server.

Figure 4:
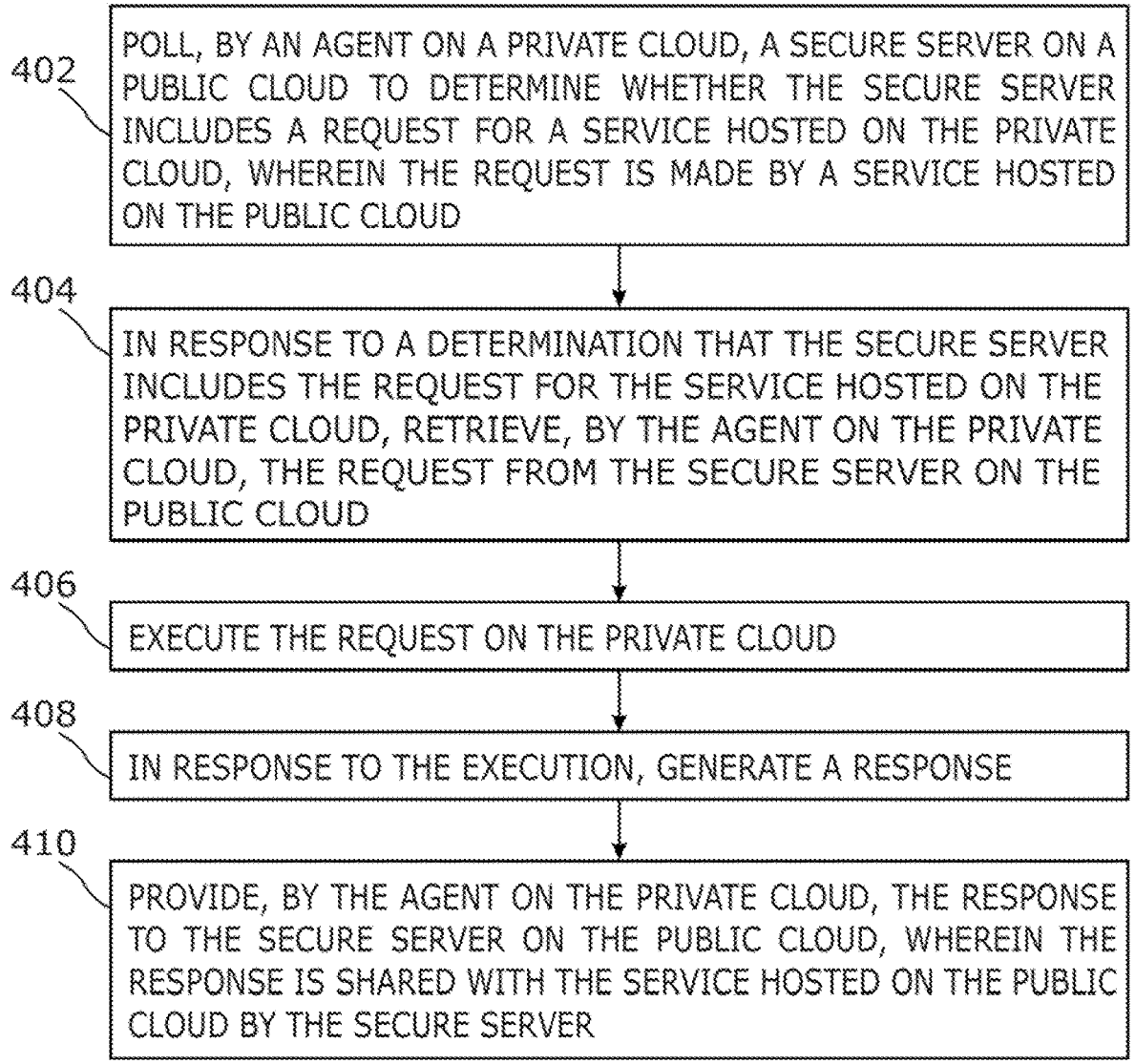
FIG. 4 is a flowchart of an example method of providing a secure communication between a service hosted on a private cloud and a service hosted on a public cloud.

FIG. 4 is a flowchart of an example method 400 of providing a secure communication between a service hosted on a private cloud and a service hosted on a public cloud. The method 400, which is described below, may be executed on a computing device such as computing resource 106 of FIG. 1 or system 300 of FIG. 3. However, other computing devices may be used as well. At block 402, an agent on a private cloud may poll a secure server on a public cloud to determine whether the secure server includes a request for a service hosted on the private cloud. The request may be made by a service hosted on the public cloud. At block 404, in response to a determination that the secure server includes the request for the service hosted on the private cloud the agent may retrieve the request from the secure server on the public cloud. At block 406, the agent may execute the request on the private cloud. At block 408, the agent may generate a response. At block 410, the agent may provide the response to the secure server on the public cloud. The response may be shared with the service hosted on the public cloud by the secure server.

Figure 5:
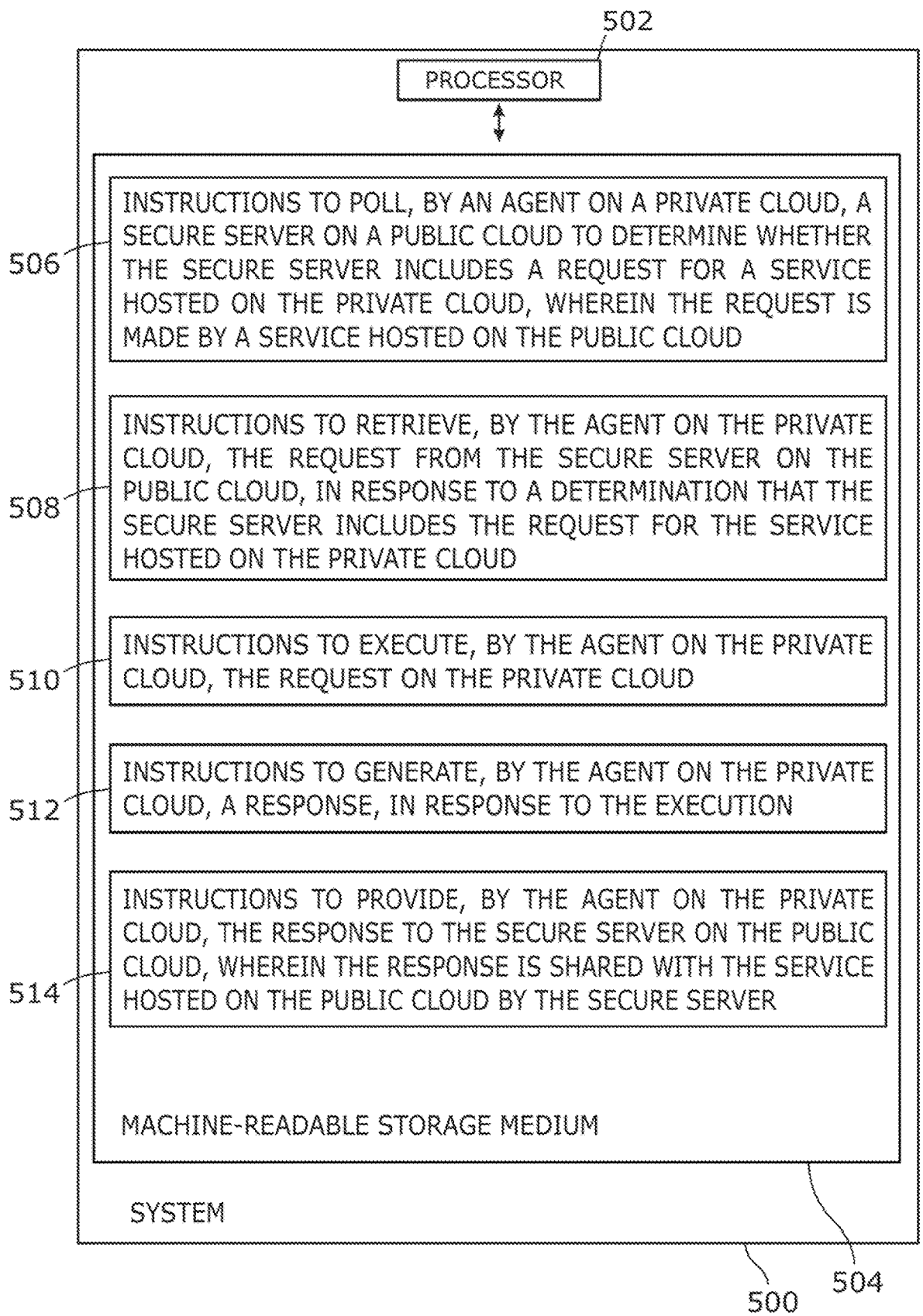
FIG. 5 is a block diagram of an example system including instructions in a machine-readable storage medium for providing a secure communication between a service hosted on a private cloud and a service hosted on a public cloud.

FIG. 5 is a block diagram of an example system 500 including instructions in a machine-readable storage medium for providing a secure communication between a service hosted on a private cloud and a service hosted on a public cloud. System 500 includes a processor 502 and a machine-readable storage medium 504 communicatively coupled through a system bus. In some examples, system 500 may be analogous to a computing resource 106 of FIG. 1 or system 300 of FIG. 3. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506, 508, 510, 512, and 514.

In an example, instructions 506 may be executed by processor 502 to poll, by an agent on a private cloud, a secure server on a public cloud to determine whether the secure server includes a request for a service hosted on the private cloud, wherein the request is made by a service hosted on the public cloud. Instructions 508 may be executed by processor 502 to retrieve, by the agent on the private cloud, the request from the secure server on the public cloud, in response to a determination that the secure server includes the request for the service hosted on the private cloud. Instructions 510 may be executed by processor 502 to execute, by the agent on the private cloud, the request on the private cloud. Instructions 512 may be executed by processor 502 to generate, by the agent on the private cloud, a response, in response to the execution. Instructions 514 may be executed by processor 502 to provide, by the agent on the private cloud, the response to the secure server on the public cloud, wherein the response is shared with the service hosted on the public cloud by the secure server.

For the purpose of simplicity of explanation, the example method of FIG. 4 is shown as executing serially, however it is to be understood and appreciated that the present and other examples are not limited by the illustrated order. The example systems of FIGS. 1, 3, and 5, and method of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method of secure communication between services hosted on a private cloud and a public cloud, comprising:
   polling, by an agent on a private cloud, a secure server on a public cloud to determine whether the secure server includes a request for a service hosted on the private cloud, wherein the request is made by a service hosted on the public cloud;
   in response to a determination that the secure server includes the request for the service hosted on the private cloud, retrieving, by the agent on the private cloud, the request from the secure server on the public cloud;
   executing the request on the private cloud;
   in response to the execution, generating a response; and
   providing, by the agent on the private cloud, the response to the secure server on the public cloud, wherein the response is shared with the service hosted on the public cloud by the secure server.

2. The method of claim 1, wherein:
   executing comprises executing the request by the agent on the private cloud; and
   generating comprises generating the response by the agent on the private cloud.

3. The method of claim 1, wherein:
   executing comprises executing the request by the service hosted on the private cloud; and
   generating comprises generating the response by the service hosted on the private cloud.

4. The method of claim 1, wherein the retrieving comprises retrieving the request based on first in, first out (FIFO).

5. The method of claim 1, wherein the polling comprises polling the secure server at pre-defined time periods.

6. The method of claim 1, wherein the retrieving is performed using Transport Layer Security (TLS) authentication.

7. The method of claim 1, wherein the executing the request on the private cloud comprises executing a Hypertext Transfer Protocol (HTTP) request.

8. A system, comprising:
   a polling engine to poll a secure server on a public cloud to determine whether the secure server includes a request for a service hosted on a private cloud, wherein the request is made by a service hosted on the public cloud;
   a retrieval engine to retrieve the request from the secure server on the public cloud, in response to a determination that the secure server includes the request for the service hosted on the private cloud;
   an execution engine to execute the request on the private cloud;
   a generation engine to, in response to the execution, generate a response; and
   a response engine to provide the response to the secure server on the public cloud, wherein the response is shared with the service hosted on the public cloud by the secure server.

9. The system of claim 8, wherein the request includes an HTTPs request.

10. The system of claim 8, wherein the request is made through an HTTPClient that specifies the secure server as a destination for the request made by the service hosted on the public cloud.

11. The system of claim 8, wherein the request is queued on the secure server on the public cloud.

12. The system of claim 8, wherein the response to the secure server on the public cloud is provided via port 80.

13. The system of claim 8, wherein the response to the secure server on the public cloud is provided via port 443.

14. The system of claim 8, wherein the response to the secure server on the public cloud is provided using HTTP.

15. A non-transitory machine-readable storage medium comprising instructions, the instructions executable by a processor to:
   poll, by an agent on a private cloud, a secure server on a public cloud to determine whether the secure server includes a request for a service hosted on the private cloud, wherein the request is made by a service hosted on the public cloud;
   retrieve, by the agent on the private cloud, the request from the secure server on the public cloud, in response to a determination that the secure server includes the request for the service hosted on the private cloud;
   execute, by the agent on the private cloud, the request on the private cloud;
   generate, by the agent on the private cloud, a response, in response to the execution; and
   provide, by the agent on the private cloud, the response to the secure server on the public cloud, wherein the response is shared with the service hosted on the public cloud by the secure server.

16. The storage medium of claim 15, wherein a Globally Unique Identifier (GUID) is assigned to the request made by the service hosted on the public cloud.

17. The storage medium of claim 16, wherein the GUID is used by the secure server to correlate the request with the response.

18. The storage medium of claim 15, wherein the agent is part of a Representational state transfer (RESTful) service.

19. The storage medium of claim 15, wherein the request is retrieved based on first in, first out (FIFO).

20. The storage medium of claim 15, wherein the response to the secure server on the public cloud is provided via one of port 80 and port 443.

* * * * *